Figure 1:
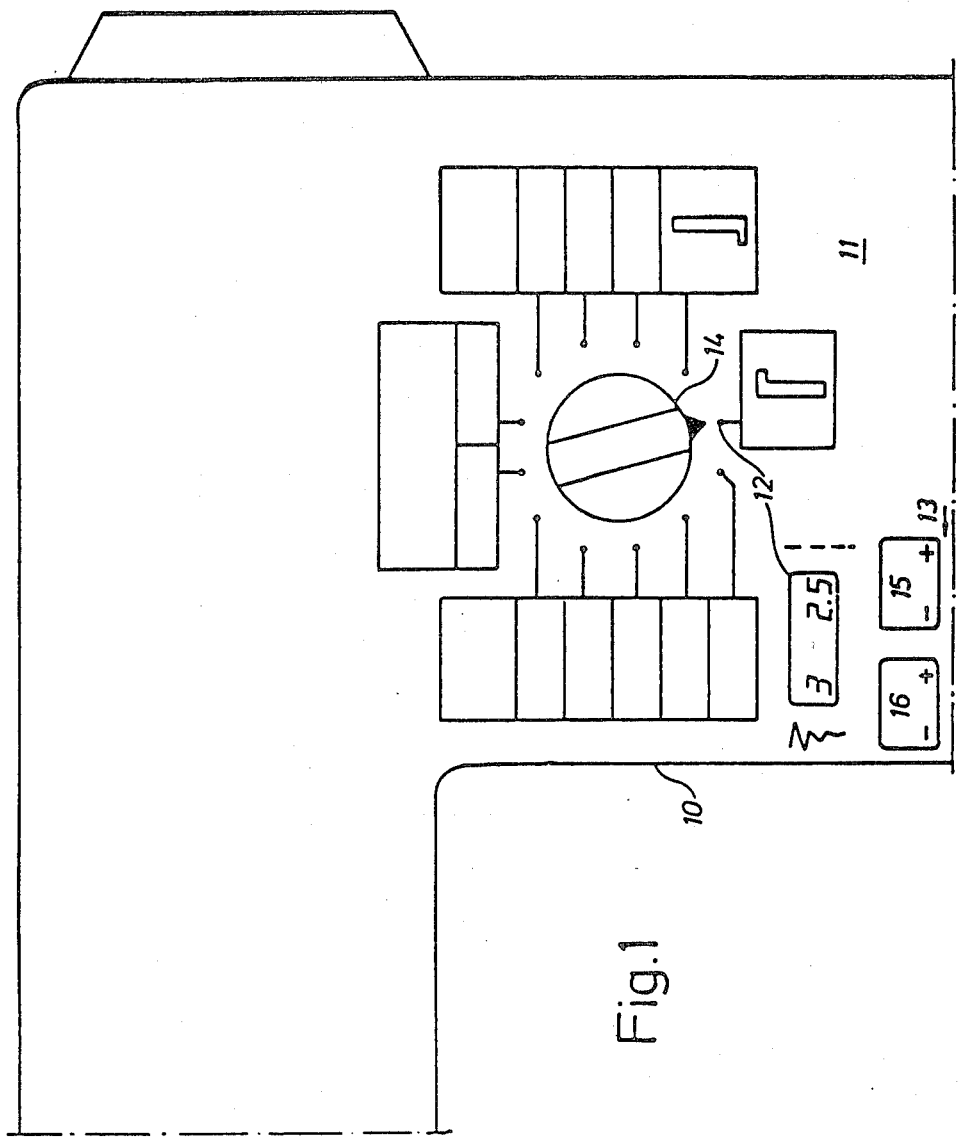

INCINERATION OF AND ENERGY RECOVERY FROM RELATIVELY INCOMBUSTIBLE WASTE, ESPECIALLY RUBBER AND PLASTIC

This is a continuation-in-part of application Ser. No. 226,683, filed Jan. 21, 1981, now abandoned.

The present invention relates to the incineration of and energy recovery from waste, preferably rubber waste from retreading shops. However, the invention can also be used with good results for a number of other fuels and waste materials in powdered or liquid form, such as plastic waste, coal dust or biomass, the latter also in mixtures with water or oil, as well as solvents, tars, etc.

Rubber waste, especially worn-out automobile tires, presents a very large waste handling problem, partly because rubber in general is hard to burn, handle or recycle and partly because the amount of waste in question is so great. A plurality of different methods such as incineration, cooling and grinding, pyrolysis, recycling in road surfacing, use in embankments, etc., have been tested both for destroying the rubber and recycling it.

Existing incineration plants are adapted for the incineration of whole or cut-up tires. By incineration, is meant flame combustion-oxidation with an excess of air and not pyrolysis or combustion in a fluidized bed. Flame combustion in existing incineration plants takes place at 800°–1000° C. with a great excess of air and, as a rule, in two steps. In the first step the rubber is subjected to pyrolysis in conjunction with the feed-in zone and in the second step the pyrolysis gas is subjected to a final combustion in a zone into which extra air and auxiliary fuel is added.

The furnaces can be single- or double-chamber furnaces, for example, furnaces having air supply in different zones, rotary ovens or furnace types having travelling gates followed by afterburners, etc.

A significant problem in using such incineration plants is that they produce about 300–350 ppm of nitrogen oxides (NOx) as measured in the output stack after combustion has occurred. In fluidized bed combustion, the NOx can be reduced to about 250 ppm. Such large amounts of NOx emissions are particularly undesirable.

Said previous incineration plants are very large units. However, when it comes to smaller amounts of rubber waste, for example, waste from retreading shops or the like, there is a need for rather small incineration plants which partly can ensure the advantageous use of rubber waste and partly deliver a large portion of the energy needed for operation of the plant. Retreading shops provide a waste product called rubber dross in an amount ranging from 50 up to several hundred kilos/hour. Rubber dross is a mixture of fine rubber powder and approximately 1–2 cm long rubber strips cut from the old tire casing in a special drossing machine. Rubber dross has a great energy content, a heat value of approximately 9,500 kcal/kg, and can thereby be very suitable for steam regeneration and the like.

Technically speaking, it would naturally be fully possible to burn said rubber waste centrally in an existing type of incineration plant, but to this one would have to add the transport of rubber and the retreading plant would lose the relatively large energy content of the rubber waste.

In the incineration of rubber waste in an incineration plant according to the invention, the rubber dross is first ground into granules having a maximum particle size of 1.5–2 mm. The ground rubber dross is then sucked from the outlet of the grinder through a transport fan and pushed into a furnace where it is ignited by recirculated flue gas and subjected to a final combustion. The furnace has a special construction so as to retain the rubber granulate so long that an extensive combustion is able to take place at a high level of turbulence and high temperature, 1,200°–1,300° C.

The combustion chamber of the present invention permits one to achieve NOx emissions of about 115–130 ppm, i.e., much lower than achieved heretofor.

The furnace, which is the heart of the incineration plant, is in principle a cyclone furnace having a sophisticated air register for the addition of the combustion air. In this way, a carefully-controlled reflow into the furnace is obtained allowing the return of hot combustion gas to the primary zone so as to expedite overignition and final combustion.

The reflow is induced by the air register which provides the combustion air with a predominantly tangential component and thereby creates the possibility of extended period of stay for the fuel particles. The period of stay is also extended by means of a heavy outlet choke because of its reduced area opening. Said furnace construction makes possible an approximately 90% combustion of rubber ground to maximum 1.5–2 mm in a conventional rotary cutter. Incineration takes place at 1,200°–1,300° C. and at a lower excess of air than is normally used for rubber.

Conventional cyclone furnaces are very sensitive to the particle size which should be less than 0.5 mm. The burning speed of the fuel is also an important parameter. Rubber is one of those fuels which despite their high heat values have a low burning speed, i.e., due to the rubber polymer cross-links being hard to destroy, said cross-links originating from vulcanization with sulphur.

The connection to the boiler is also important for the incineration plant, the furnace and boiler cooperating as an integral unit. By means of the furnace being tangentially mounted onto the bottom part of the boiler, a rotation and turbulency is created which provides a final combustion of remaining soot and larger particles. By means of the high combustion temperature, a smaller boiler can be used for the same effective output than what would have been necessary in a conventional rubber incineration plant.

Figure 2:
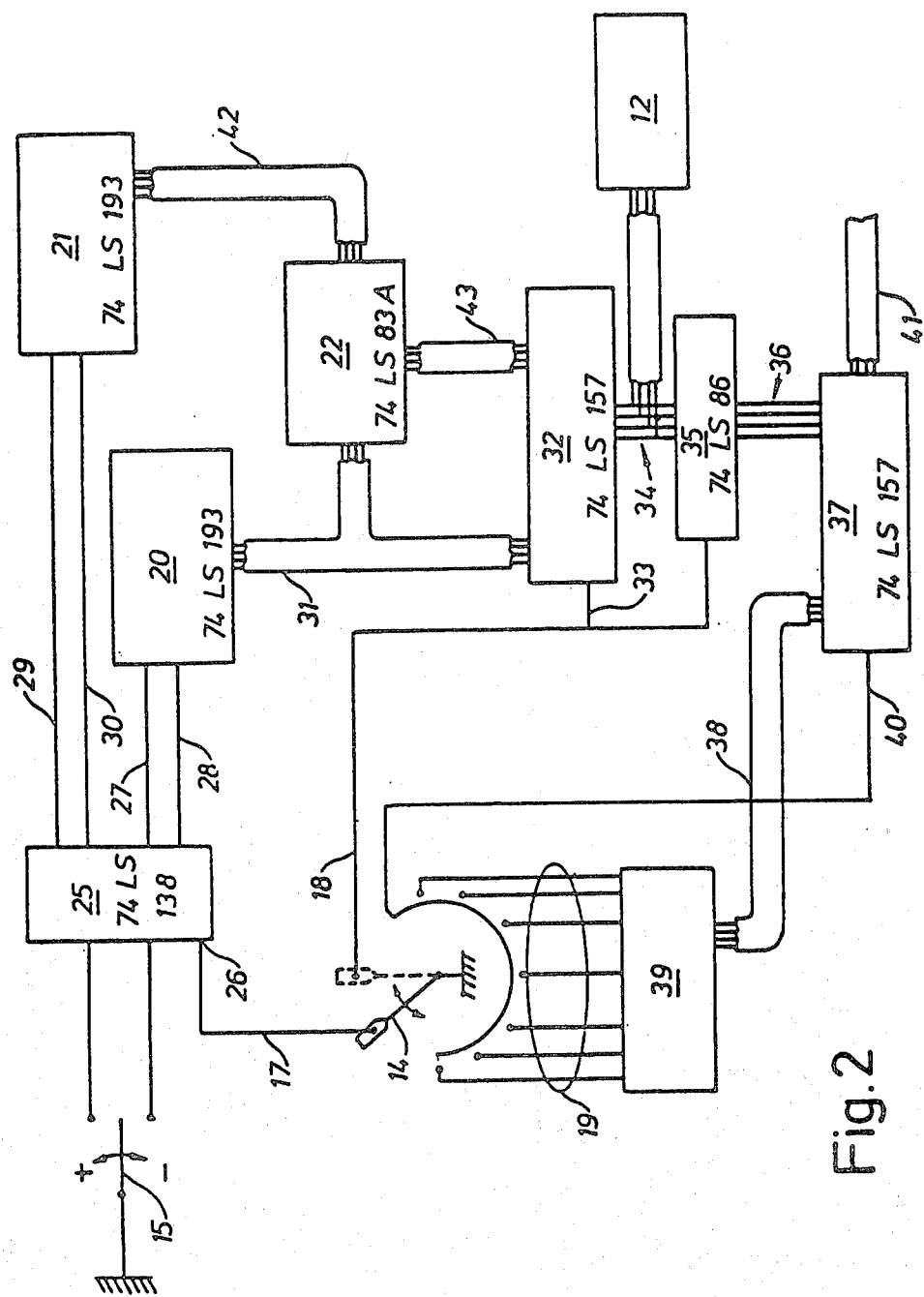

In order to further illuminate the invention, an example of a plant shall be described in detail in connection with the accompanying drawings of which FIG. 1 shows schematically an energy recovery plant for rubber waste and FIG. 2 is a furnace for the main incineration of the rubber particles.

Rubber dross is blown from the fan in a drossing machine (not shown here) through the pipe 1 to a cyclone 2 and is colected in a silo 3. The rubber dross is apportioned out from the silo by a vibrating screw feeder 4 to a grinder 5 which grinds the rubber to a granulate having a maximum particle size of 1.5–2 mm.

The ground rubber is sucked from the outlet of the grinder by a transport fan 6 and is pushed into the furnace 7, the construction of which is described in more detail below. The rubber granulate is ignited in the furnace 7 and kept there until final combustion is at hand. The furnace is situated tangentially of and on the bottom end of a steam boiler 9 so that the hot exhaust is caused to rotate heavily resulting in a final combustion of the granulate. The primary and auxiliary fuel system

ARRANGEMENT IN AN ELECTRONIC SEWING MACHINE

The present invention relates to an arrangement in an electronic sewing machine with a memory and data circuits for performing fancy seams, such as button holes.

When sewing two seams, e.g. rows of zigzag stitches of a button hole made by forward feeding in a first row and reverse feeding in a second row, it will be found that equal length of the feeding movement in each seam does not provide equally tight seams (rows), since the cloth feeder does not work as effectively in the reverse direction as in the forward direction, and the feeding mechanism does not effect exactly the same length of the feeding movements in the forward direction as in the reverse direction. It is therefore necessary to make a correction when sewing the second seam in order to have the same stitch density of the second seam as that of the first seam. Every kind of cloth demands a special correction, and this must therefore be adjusted by the operator.

The present invention provides a memory arrangement in an electronic sewing machine by which it is possible to automatically perform seams having equal stitch lengths independent of the feed direction. The arrangement comprises two individually usable memory units which are to be individually adjusted for the different stitch lengths of the respective seams. Electronic sewing machines are already provided with a stitch length memory which keeps the adjustment of a stitch length control from the one fancy seam to the other, and this memory can preferably be used when sewing the first seam.

A sewing machine according to the invention, has the ability to reproduce seams with a stitch length determined in advance for a selected seam and having adjusting means on which the opertor selects a seam.

An example of such an arrangement in a sewing machine according to the invention will be described in the following with references to the attached drawing which shows in FIG. 1 a panel with a seam selection device of a sewing machine, FIG. 2 a general diagram of a control unit for performing i.a. a button hole seam, and FIG. 3 a general diagram of a variation of such a control unit.

On a sewing machine provided with a post 10 is mounted a control panel 11 with indicating means 12, buttons 13 and a rotary control 14. These members are used for informing the electronic control unit of the machine (FIGS. 2 and 3) of a certain seam selection. The rotary control is used for making an adjustment on a certain fancy seam, such as a button hole which may be shown by symbols at several positions around the rotary control. After the adjustment of this control the zigzag width and the stitch length can be adjusted individually on a couple of switches 15,16. The indicating means above these switches show the adjusted width and length respectively.

Figure 3:
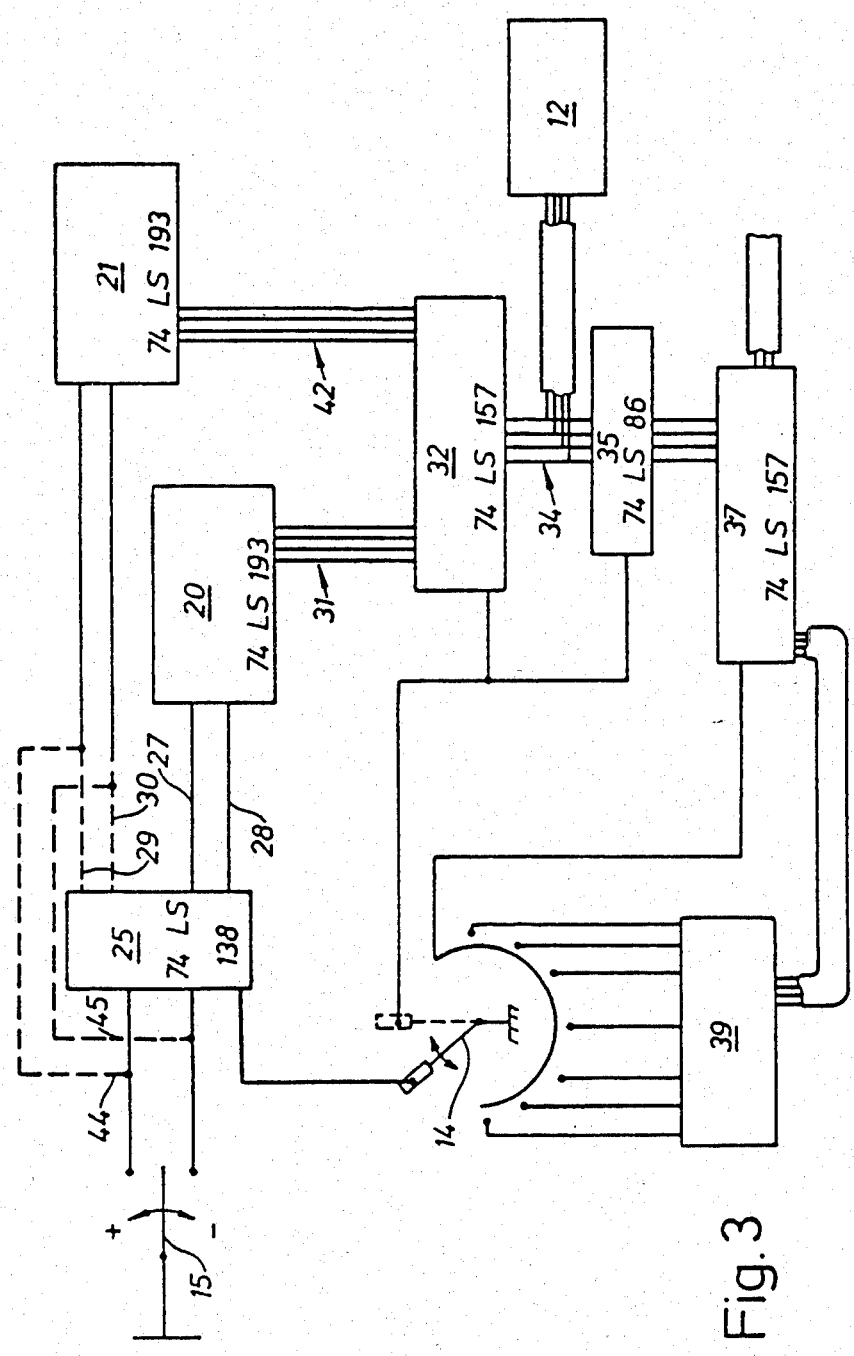

Output wires are provided from the contacts of every adjusted position on the rotary control, e.g. a wore 17 for the first row of zigzag stitches of the button hole, a wire 18 for the second row, and a group 19 for the other seams (FIGS. 2 and 3). The diagram of these figures are only related to the control of the stitch length for the sewing of the seams. However, a similar diagram may be used for the control of the zigzag width, but in the illustrated embodiment the problem of concern is the balance between forward and reverse feeding, so the zigzag control is not specifically discussed here.

An embodiment of a control unit is shown in FIG. 2 where two binary counters 20,21 are used as two individual memories, one for each one of the rows of zigzag stitches of a button hole. The stitch length changing switch 15 is so connected that during the sewing of the first row only the counter 20 is adjusted and during the sewing of the second row only the counter 21 is adjusted. Counter 21 contains then a stitch length difference which can be positive, negative or zero. The code of the total stitch length of the second row is put together in an adding unit 22.

An embodiment supplying these functions is shown in FIG. 2. The switch 15 has three positions, i.e. a neutral (center) position, a position for increase of the stitch length (+) and one for decreasing (−). From the plus and minus positions, respectively, output wires 23, 24 extend to a decoder 25 which also has a third input 26 to which the wire 16 of "the first row" is connected. Two pairs of wires 27, 28 and 29, 30 are connected to the output of the decoder passing pulses in dependence of a signal on the third input to either of the counters 20 or 21. The wire 27 is disposed for counting upwards on the counter 20, and the wire 28 for counting downwards on the same. In the same way the wire 29 is disposed for counting upwards on the counter 21 and the wire 30 for counting downwards. When the rotary control 14 is positioned as shown (in continuous lines), pulses can be output on the pair of wires 27, 28, and repeated pushings on the plus side of the switch will step the counter upwards and similar pushings on the minus side will step it downwards. At the centre position of the switch 15 the counter stops at the adjusted number. This number is output in the form of a 4-bits code on a group 31 to the adding unit 22 and a selector 32, respectively. When no signal is present on the shift input 33 of the selector, the code on the group 31 is passed to the output of the selector where a group 34 branches the code to an exclusive OR-gate 35 and the indicating means 12, respectively. This means comprises a code converter which converts the code into figures which appear on the display of the arrangement. The gate 35 is an exclusive OR-gate on which the same shift signal is introduced as that of the selector 32. From the gate a group 36 extends to another selector 37 which has another input for a group 38 from an encoder 39 controlled by the other positions of the rotary control (not button holes). By an adjustment on the positions for button holes no shift signal is passed to the shift input 40 of the selector, so all information on the group 36 is forwarded on the group 41 to the feeding mechanism of the machine, e.g. feeding circuits for a step motor. The counter 20 keeps its allotted number also when the control 14 is positioned on the second part of the seam (dashed lines). Then the output pulses of the decoder 25 change from the wires 27, 28 to the wires 29, 30 extended to the counter 21. This counter is normally adjusted to zero when the machine is switched on, but counts upwards and downwards in the same way as the counter 20 when the switch 15 is actuated in a similar manner. The adjusted binary number passes on a group 42 to the adding unit 22 where the numbers on the groups 31 and 42 are counted up. On the output group 43 from the adding unit to the selector 32 there is then the code of the stitch length of the second part of the seam. Now, the selector has its shift signal on the wire 18 which means that the code on the group 43 is forwarded to the gate 35 which also has a shift signal from the wire 18. The indication means 12 shows the new corrected stitch length which simplifies the adjustment of the stitch length of the second part. The counter stores the code which it is allotted also during sewing another seam. When the control 14 is put into the shown dash-line position, the code is passed to the adding unit and a correction of the stitch length takes place in the manner here before described. Thus, when such a correction is determined once for a certain material, this correction can be used an arbitrary number of times as long as the machine is switched on. As an example there are denoted on the drawing the numbers of the standard circuits according to TTL-standard on which the control unit is based.

A variation of the control unit is shown in FIG. 3 which is also based on TTL-circuits. This embodiment is also provided with two programmable memories in the form of counters 20, 21. The stitch length changing switch 15 is so connected that during sewing the first row of zigzag stitches the counter 20 is actuated, and during sewing the second row the counter 21 is actuated. The outputs 31 and 41 of the counters are connected to the selector 32 where the one code or the other is passed to the output 34. After that the circuits are the same as in FIG. 2. The counters are stepped individually as here before described, and the stored code information is supplied via the selector 32 in dependence of the position of the rotary control 14 (continuous lines or dash-lines) to gates, indicating means and feeding circuits to the step motor.

The difference with respect to the embodiment in FIG. 2 is that here the counters control the stitch lengths one by one during the first row of zigzag stitches and the second row, respectively.

An alternative connection between the switch 15 and the counter 21 is shown in FIG. 3 by dash-lines 44, 45. The switch 15 is then so connected that during sewing the first row both the counters 20, 21 are actuated and during sewing the second row only the counter 21. The wires 29, 30 are removed in this embodiment, bringing that the counter 21 gets pulses directly from the switch 15. As the counters at the adjustment of the first row go together, the starting point for the adjustment of the counter 21, when the control is put on the dash-line position, will be the stitch length former used during the first row. The correction can herefrom be made upwards or downwards until the balance between the rows is as wanted. The adjustments on the respective counters remain during an unlimited number of seams. As both the counters are actuated at the beginning of a button hole, the stitch length can be adjusted for both the rows at the same time.

The variations of the control unit above described only show how this can be embodied. The functions of TTL-circuits are known and described in corresponding product specifications which facilitates the understanding of the invention. However, the control unit can, of course, be designed without the assistance of TTL-circuits and thus be made more compact. The invention shall therefore not be considered restricted to the use of said standard circuits but include other types of the art which can here be applied. The switches 14 and 15 can also be designed in several ways. The rotary switch 14 may e.g. be designed as a group of buttons with a mechanical or electrical contact function or as buttons which by actuating via an electronic stepping device changes the seam selection from one seam to another. The switch 15 may e.g. be composed of two buttons or as a lever with a neutral centre position and resetting springs at the side positions. Other embodiments than those here before described may be possible.

I claim:

1. In an arrangement of an electronic machine with a needle bar mechanism and a cloth feeder and a memory unit for the generation of stitch code for the control of the zigzag motions of the needle and the feeding movements of the feeder in order to produce fancy seams, the improvement wherein the memory unit comprises two programmable electronic memories for the stitch length, adjustable by means of a manually operated switch, a first one of these memories is connected to said switch when a manually operated switching means is positioned to enable the sewing of a first portion of the fancy seam and the second memory is connected to the said switch when said switching means is positioned to enable the sewing of a second portion of the fancy seam, and that the two memories are adapted, separately or in combination, for storing and supplying of data for each of said portions during the repetition of sewing of said fancy seam.

2. The arrangement of claim 1, wherein the two memories are connected to said switch when said switch means is positioned to enable the sewing of the first portion of the fancy seam.

3. The arrangement of claim 1, wherein a data word in said second memory related to said second portion of the fancy seam is added to a data word stored in said first memory during a repetition of sewing the seam.

4. The arrangement of claim 1, wherein the stitch length during sewing the said first portion of the fancy seam is independent of the operation of the said switch during the earlier sewing of the said second portion.

5. The arrangement of claim 1 wherein said fancy seam is a buttonhole stitch, the first and second portions thereof being opposite side of the buttonhole.

6. In an electronic sewing machine having a needle bar mechanism, a cloth feeder, and a memory unit for the generation of stitch codes for the control of zigzag motion of a needle and the feeding movements of said feeder for the production of fancy seams, the improvement wherein said memory unit comprises first and second programmable electronic memories for storing separate stitch lengths, manually operable means connected to program said electronic memories, selector switch means having a plurality of positions for selecting stitch portions, means connecting said manually operable means to different ones of said memories at different positions of said selector switch means, and means for selectively supplying the data stored in said memory for the sewing of respective portions of a fancy seam.

7. The electronic sewing machine of claim 6 wherein said memories comprise electronic up-down counters.

* * * * *